United States Patent Office 3,024,211
Patented Mar. 6, 1962

3,024,211
PLASTIC COMPOSITION OF ISOTACTIC MONO-OLEFIN POLYMER AND CYCLIZED NATURAL RUBBER
Lawrence E. Daly, South Bend, Ind., assignor to United States Rubber Company, New York, N.Y., a corporation of New Jersey
No Drawing. Filed Sept. 6, 1956, Ser. No. 608,217
7 Claims. (Cl. 260—4)

This invention relates to an improved plastic composition and more particularly to a composition comprising a particular kind of plastic monoolefin polymer and cyclized rubber.

Recently there have been introduced to the art new plastic monoolefin polymers, particularly polyethylene and polypropylene, made by what is popularly referred to as the low pressure process, which have a unique combination of physical properties that makes them desirable in many applications. These polymers are characterized by high molecular weight (e.g. 20,000 or more, up to 3,000,000 and even higher) and they are largely isotactic, typically highly crystalline materials, having molecules made up mainly of straight chains with a minimum of branching. In contrast, the previously known form of polyethylene plastic made by the so-called high pressure process was believed to be made up largely of highly branched chains and it was essentially a non-isotactic, amorphous material having a relatively low melting point (e.g. only 100° or 110° C.). The melting point of the new low pressure plastic monoolefin polymers are typically much higher, e.g., about 130° C. to 160° C. or more. Methods of preparing these new plastic monoolefin polymers are described, for example in Belgian Patents 534,888, January 14, 1955, and 538,782, June 6, 1955, of Karl Ziegler. Such methods involve the use of special catalysts in the nature of certain compounds of metals of groups IVB to VIB of the periodic system, and metals or compounds of groups IA to IIIA of the periodic system. These catalysts are used to polymerize such monoolefins as ethylene, propylene, 1-n-butene, 1-n-hexene, or mixtures thereof, to form isotactic typically plastic polymers (as distinguished from elastomeric polymers) that are highly crystalline and dense, and have high melting points. Similar plastic monoolefin polymers can be prepared using heterogeneous catalysts comprising metal alkyls and metal halides, as developed by Professor Guido Natta of the Milan Polytechnical Institute. Likewise plastic monoolefin polymers of this character can be made with catalysts comprising chromium salts on an alumina-silica carrier, as developed by the Phillips Petroleum Co. The present invention is specifically directed to typically plastic polymers of this class, represented by products made with the Ziegler, Natta, or Phillips catalysts.

The following table is presented as an example of differences between the new so-called "low pressure" polyethylene and older "high pressure" type:

|  | Ziegler, Natta or Phillips type "low pressure" polyethylene | "High pressure" regular polyethylene type |
|---|---|---|
| Type of process: |  |  |
| Pressure | Low | High. |
| Temperature | do | Do. |
| Conversion | High in single pass | Low per pass. |
| Color stability | Excellent up to 200–250°C | Turns grey at 200–250°C. |
| Purity of monomer required | Specifications not as stringent as for "high pressure" | Very high. |
| Oxidation resistance | Excellent | Not as good as Ziegler material. |
| Mol. weight | 300,000 → 3,000,000 | ~50,000. |
| Softening point | Above 130°C | ~100°C. |
| Degree of crystallinity | 80% | 60–65%. |

|  | Ziegler, Natta or Phillips type "low pressure" polyethylene | "High pressure" regular polyethylene type |
|---|---|---|
| Tear resistance | 100 kg./cm.² minimum often over 200 kg./cm.². |  |
| Tensile unoriented film | Above 200 kg./cm.² (2,840 p.s.i.). | 1,600. |
| Tensile oriented film | Up to 3,000 kg./cm.² (42,600 p.s.i.). |  |
| Density | .94 → .97 | .92. |
| Elongation | As high as 1,200% |  |
| Stiffness modulus | 150,000 p.s.i | 30,000 p.s.i. |
| Brittleness temp | Considerably lower than brittleness temperature of "high pressure" polyethylene below −100°F. | −60–75°F. |
| Vapor transmission rates and gas transmission rates | Rates for "low pressure" polyethylene are about ⅙ those of "high pressure" polyethylene. |  |
| Burst strength of pipe | "Low pressure" polyethylene is about 4 times as great as that of "high pressure" polyethylene for pipe of the same size. |  |
| Stress-crack resistance | Much greater for "low pressure" polyethylene. |  |
| Hardness on the Shore D scale | 65–70 | 48. |
| Surface appearance | Smooth | Dull, waxy. |

The following table similarly shows significant differences of polypropylene plastic:

|  | "Low pressure" Polypropylene | Regular Polyethylene |
|---|---|---|
| Mol. weight | 20,000–1,000,000 | 50,000. |
| 1st order transition | 158–170°C | 100–110°C. |
| Density | .90→.97 | .92. |
| Extensibility | Up to 700% |  |
| Tensile of sheet | 42,600 p.s.i.[1] | 2,000 p.s.i. |
| Transparency | Excellent (Cellophane clear) | Cloudy. |
| Surface appearance | Approaches polystyrene gloss | Waxy, dull. |

[1] Oriented.

The invention is particularly applicable to plastic monoolefin polymers of this kind selected from the group consisting of polyethylene and polypropylene. Polyethylene plastic and polypropylene plastic constitute the preferred materials for use in the invention, and these two materials together form an important preferred sub-group within the general class. Of the sub-group consisting of polyethylene and polypropylene, the preferred species is polyethylene.

The isotactic polyethylene or similar plastic monoolefin polymer made by the Ziegler, Natta or Phillips processes is stiffer and harder than conventional polyethylene and it is much more resistant to heat deformation—for example, in resisting distortion in boiling water. The isotactic polyethylene or the like can be injection molded or extruded to make many items of improved quality in comparison to the conventional plastic materials that were available before. However, these new isotactic plastics have one very serious drawback, in that they cannot be processed on conventional type plastic or rubber processing equipment such as three and four roll calenders, roll mills, and internal mixers of the Banbury type. They can only be extruded or injected. The reason for this is that these new plastic monoolefin polymers are very sticky at the elevated temperatures to which they are subjected in mills or calenders.

Efforts to overcome the foregoing deficiency of isotactic polyethylene by using known lubricants such as the silicone oils or greases, zinc stearate, waxes, etc. have failed to improve the hot processing properties. The new polyethylene plastics are not only sticky but they are also quite soft at the temperatures to which they are subjected on roll equipment, making it impossible to remove the plastic from the rolls in smooth sheet form.

I have now found, unexpectedly, that this deficiency of isotactic Ziegler plastic monoolexin polymers such as polyethylene or polypropylene can be overcome, and the properties of the plastics can be considerably improved by blending the new polyethylene or the like with certain proportions of cyclized natural rubber. Cyclized natural rubber is a known commercially available material, also referred to as rubber isomer, derived from natural rubber and having generally the same empirical formula as natural rubber, but characterized by considerably less unsaturation than natural rubber. It can be made by a variety of known processes, generally involving treating the rubber with reactive chemicals such as hydrogen halides, aryl sulfonic acids, sulfuric acid and alum, halides of amphoteric metals, chlorostannic acid, etc. The cyclized natural rubber made by the method of U.S. Patent 2,230,359, McKenzie, February 4, 1941, is especially suitable. Other suitable methods of making cyclized natural rubber are described in U.S. Patents 1,797,188, Bruson, February 23, 1932; 1,846,247, Bruson, February 23, 1932; 2,050,209, Gehman, August 4, 1936; 2,363,654, Daly, November 28, 1944; 2,379,939, Vance, July 10, 1945. The commercial cyclized natural rubber known as "Pliolite NR" (made by the Goodyear Co.) is suitable. Typical cyclized natural rubber is usually a fine white powder, having a specific gravity of 1.00 to 1.08, and has a softening range of 50–110° C. It exhibits remarkable resistance to acids, alkalies and corrosive chemicals. It also withstands water and vapor penetration and possesses excellent dielectric properties.

For purposes of the invention from 5 to 50 parts of the cyclized natural rubber are blended intimately with correspondingly from 95 to 50 parts of the isotactic Ziegler polyethylene. This blending may be carried out in any equipment suitable for mixing plastics or rubbers, such as a roll mill or an internal mixer. It is surprisingly found that the resulting mixture can be calendered smoothly and efficiently without sticking, and can be readily formed into uniform sheets without tearing or distortion of any kind. This behavior is in striking contrast to the behavior of the isotactic polyethylene itself, which is virtually impossible to calender or sheet out in a satisfactory manner.

In accordance with a preferred practice of the invention, I also include in the mixture of isotactic polyethylene plastic and cyclized natural rubber a small amount of natural (Hevea) rubber, typically from 2 to 10 parts, per 100 parts of the polyethylene-cyclized rubber mixture. Preferably I further include a filler, such as finely powdered calcium carbonate, clay, silica, or silicates, floc, or the like, typically in amount of from 5 to 100 parts, per 100 parts of the aforementioned polymeric materials.

Minor amounts of pigments or other coloring matter or other resins, rubbers or other modifying ingredients may be added to the compositions of the invention to produce desired variations of the properties. Curatives such as sulfur or peroxides may be added to the compositions of the invention, so that the shaped articles made from the composition can be cured by heat (usually while applying pressure also). Such curing of the rubber phase of the mixture, however, makes it difficult to rework any scrap or the like.

The mixed blends of the invention not only can be processed on roll mills, internal mills, and calenders into smooth sheets having improved physical properties, but the molding or forming properties of flat sheets made from the blends are also greatly improved. The invention therefore opens up a whole new area in the shaping or fabrication of articles from the isotactic polyethylene plastic. Formerly, sheets of the isotactic polyethylene plastic could not be vacuum drawn, or shaped with the aid of plugs or forms, because the isotactic polyethylene had very poor hot strength, and when the sheet was heated to a temperature of 300° to 450° F. for the purpose of vacuum forming or otherwise drawing or molding, the sheet tended to thin out in some areas or to actually tear. In contrast to this, the blends of the invention can be made into sheets or similar forming blanks that have good hot strength and that stretch very evenly without thinning out or tearing when subjected to conventional vacuum forming or drawing and plug molding techniques.

The present blends of isotactic polyethylene and cyclized natural rubber, particularly those including natural rubber and filler, are much harder and stiffer than the previously known polyethylene plastic compositions. The blends also have better surface gloss than the low pressure polyethylene itself.

The improved properties of the compositions of my invention also make it possible to produce by calendering many useful articles of much larger size than it is possible to produce with injection molding equipment or with extrusion equipment. Calendered sheet stock can be made into molding blanks of almost any desired size and thickness. Also, the compositions of the invention can be calendered onto fabrics or the like, or laminated with sheet metal or other reinforcement to make composite articles.

The blends of cyclizer natural rubber and isotactic polyethylene are notable for their unusual hardness, and in this respect the effect of the cyclized rubber on the isotactic polyethylene is in striking contrast to the effect of plasticizing materials such as polyisobutylene elastomer, or low molecular weight styrene polymers or copolymers which, if used in appreciable amounts, markedly reduce the hardness.

The following examples will serve to illustrate the practice of the invention in more detail. All proportions of ingredients are expressed as parts by weight.

EXAMPLE I

Blends of isotactic polyolefin plastics and cycylized rubber, with and without natural rubber and fillers, were prepared in the various proportions shown in Table I. These blends can be mixed on either a rubber type open roll mill or in an internal mixer such as a Banbury mixer. Mixing cycles of 3–5 minutes are adequate. Temperatures in the range of 250° to 350° F. readily produce homogeneous blends. The blends including cyclized

*Table I*

CALENDERING APPEARANCE OF ISOTACTIC POLYLOEFIN PLASTIC BLENDED WITH CYCLIZED RUBBER, PALE CREPE RUBBER AND FILLERS

| Polyolefins: | | | | | | | | | | | | | | | | |
|---|---|---|---|---|---|---|---|---|---|---|---|---|---|---|---|---|
| Super Dylan 6600 [1] | 100 | | 95 | 90 | 90 | | 90 | 85 | 75 | 50 | 85 | 85 | 85 | 75 | 85 | 85 |
| Marlex [2] | | 100 | | | | 90 | | | | | | | | | | |
| Cyclized rubber [3] | | | | | | | 10 | 15 | 25 | 50 | 10 | 10 | 10 | 25 | 10 | 10 |
| #1 pale crepe rubber | | | 5 | 10 | 10 | 10 | | | | | 5 | 5 | 5 | | 5 | 5 |
| Surfex whiting [4] | | | | | 30 | 30 | | | | | 20 | 30 | 20 | | | 30 |
| Suprex clay [5] | | | | | | | | | | | | | | | 20 | |
| Could not be calendered | X | X | | | | | | | | | | | | | | |
| Calendered very rough | | | X | X | X | X | | | | | | | | | | |
| Calendered smooth | | | | | | | X | X | X | X | X | X | X | X | X | X |

[1] Super Dylan 6600 is a low pressure polyethylene made by Koppers Co.
[2] Marlex is a new low pressure type plastic monoolefin polymer made by Phillips Petroleum Co., derived from a mixed olefin stream instead of from ethylene alone.
[3] Pliolite NR made by Goodyear Rubber Co.
[4] Calcium carbonate.
[5] Approximately 44% silicon dioxide and 56% aluminum oxide.

natural rubber did not stick to either the mill rolls or the wall or rotors of the Banbury mixer. In contrast the polyethylene stuck badly and could not be discharged.

The blends were then calendered at calender roll temperatures ranging from 280° to 380° F., while the behavior of the blend on the calender and the quality of the calendered sheet was observed, with the results summarized in Table I. It will be seen that the polyolefin itself could not be calendered, and blends of the polyolefin with natural rubber could only be calendered very rough. However, when cyclized natural rubber was blended with the polyolefin plastic, the mixture surprisingly calendered smooth.

EXAMPLE II

Blends were prepared in a similar manner having the composition shown in Table II, and the calendering characteristics and physical properties were determined with the results shown in Table II. The data illustrates particularly the improved hardness and impact resistance of the blends of isotactic polyethylene blended with cyclized natural rubber as compared to the original polyethylene.

The data also show an unexpected good retention of resistance to embrittlement at temperatures as low as −50° F. especially in the range of about 75 parts polyethylene and 25 parts cyclized natural rubber.

The data also show another unexpected good retention of resistance to deformation at temperatures in the range of 212° F. (boiling water).

The data in Table II show the better impact obtained when a small amount of rubber was blended with the polyethylene-cyclized natural rubber composition. Hardness was reduced only slightly and is still better than the polyethylene plastic.

EXAMPLE III

The data of Table III further illustrates the improved hardness, impact resistance and tensile strength of polyethylene, cyclized natural rubber and natural rubber when such fillers as calcium carbonate or clay are incorporated in the compositions.

Table III
PHYSICAL PROPERTIES OF ISOTACTIC POLYETHYLENE BLENDED WITH CYCLIZED RUBBER, RUBBER AND FILLERS

| | | | | | | |
|---|---|---|---|---|---|---|
| Super Dylan 6600 | 85 | 85 | 85 | 85 | 85 | 85 |
| Cyclized rubber | 10 | 10 | 10 | 10 | 10 | 15 |
| Surfex whiting | 30 | 50 | ---- | ---- | 30 | 30 |
| Suprex clay | ---- | ---- | 10 | 20 | ---- | ---- |
| Pale crepe | ---- | ---- | 5 | 5 | ---- | 10 |
| Lubricant | ---- | ---- | ---- | ---- | ---- | ---- |
| Calender characteristics 0.0040 inch thickness | Good | Good | Good | Good | Good | Good |
| Tensile strength p.s.i. | 2,700 | 2,400 | 4,040 | 3,250 | 3,100 | 3,240 |
| Elongation, percent | 233 | 225 | 150 | 158 | 160 | 280 |
| Impact, notched charpy at −80° | 1.5 | 1.6 | 2.5 | 1.6 | 2.1 | 2.4 |
| −20° | 1.8 | 1.5 | 1.8 | 1.4 | 1.9 | 2.1 |
| Rockwell hardness "R" scale | 50 | 56 | 48 | 42 | 53 | 44 |
| Heat distortion in water, ° F. | [1] 212 | [1] 212 | [1] 212 | [1] 212 | [1] 212 | [1] 212 |

[1] Above.

EXAMPLE IV

Further compositions of the invention, and their properties, are illustrated in the following Table IV.

Table IV
PHYSICAL PROPERTIES OF ISOTACTIC POLYOLEFIN POLYMERS BLENDED WITH CYCLIZED RUBBER AND NATURAL RUBBER

| | | | | |
|---|---|---|---|---|
| Super Dylan #6600 | 85.00 | ---- | ---- | 85.00 |
| Marlex | ---- | 85.00 | 85.00 | ---- |
| Cyclized rubber (Pliolite N.R.) | 10.00 | 10.00 | 10.00 | 10.00 |
| #1 pale crepe (Hevea) | 5.00 | 5.00 | 5.00 | 5.00 |
| Surfex whiting | ---- | ---- | 50.00 | 50.00 |
| Tensile strength, p.s.i. | 3,305 | 3,410 | 2,510 | 2,400 |
| Elongation, percent | 360 | 320 | 260 | 225 |
| Rockwell hardness R. scale | 48 | 46 | 53 | 53 |
| Charpy notched impact, lbs. | 2.5 | 2.1 | 1.8 | 1.6 |
| Heat distortion vacuum formed cup dry heat ° F. | [1] 225 | [1] 225 | [1] 225 | [1] 225 |

[1] Above.

U.S. Patent 2,710,854 of Seelig and Belgian Patent 536,657 of the Phillips Petroleum Co. also disclose methods of making the new high density (at least 0.94) high melting point (at least 125° C.) polyethylene used in the invention.

These isotactic plastics can also be made at high pressures (see Modern Plastics, August 1956, pp. 45 and 234), or with catalysts and processes other than those specifically referred to herein. The popular appellation "low pressure" polyethylene is therefore something of a misnomer, and the final properties (density, melting point) and molecular structure (isotactic, crystalline) of the polymer are more important than the method of making it (see Plastics Technology, August 1956, pp. 522-523).

Table II
PHYSICAL PROPERTIES OF ISOTACTIC POLYETHYLENE POLYMERS BLENDED WITH CYCLIZED RUBBER AND NAT. NATURAL RUBBER

| | | | | | | | | | |
|---|---|---|---|---|---|---|---|---|---|
| Super Dylan 6600 | 100 | 90 | 85 | 80 | 75 | 85 | 50 | 95 | 85 |
| Cyclized rubber | ---- | 10 | 15 | 20 | 25 | 10 | 50 | ---- | ---- |
| #1 pale crepe rubber | ---- | ---- | ---- | ---- | ---- | 5 | ---- | 5 | 15 |
| Charpy notched impact strength at— | | | | | | | | | |
| 80° F | 1 | 1.71 | 1.5 | 1.3 | 1.2 | 2.5 | 0.64 | 2.3 | 3.5 |
| −20° F | 0.7 | 1.6 | 1.4 | 0.87 | 1.04 | 1.8 | 0.77 | 2.1 | 3.0 |
| Rockwell hardness "R" scale | 41 | 50 | 55 | 59 | 66 | 48 | 85 | 38 | 10 |
| Percent elongation at break | 400 | 370 | 310 | 348 | 226 | 360 | 110 | 371 | 160 |
| Tensile strength, p.s.i. | 3,200 | 3,310 | 3,290 | 3,280 | 3,235 | 3,305 | 2,700 | 2,800 | 2,460 |
| Heat distortion temperature of vacuum molded cup immersed in heated water, ° F. | [1] 212 | [1] 212 | [1] 212 | [1] 212 | [1] 212 | [1] 212 | 200 | [1] 212 | ---- |
| Brittleness | Good | Good | Good | Good | Good | Good | Good | Good | ---- |
| Temp., ° F. | −30 / −50 | −30 / −50 | −30 / −50 | −30 / −40 | −30 | −30 / −50 | 0 | −30 | ---- |
| Calendar characteristics—0.0040 inch thickness | (2) | Good | Good | Good | Good | Good | Good | (3) | (4) |

[1] Above. [2] Cannot be calendered. [3] Very rough. [4] Hardness low-rough.

Having thus described my invention, what I claim and desire to protect by Letters Patent is:

1. A composition characterized by good calendering and milling properties and good hot strength comprising 50 to 95 parts by weight of a crystalline, isotactic, predominantly straight chain plastic monoolefin polymer having a melting point of from 130° to 160° C. that ordinarily cannot be calendered and ordinarily has poor hot strength, and correspondingly from 50 to 5 parts of cyclized natural rubber, the said cyclized rubber serving to impart to the composition good calendering properties and good hot strength, the said monoolefin being selected from the group consisting of ethylene and propylene.

2. A composition corprising 50 to 95 parts by weight of crystalline, isotactic, predominantly straight chain polyethylene having a melting point of 130° C. and correspondingly from 50 to 5 parts of cyclized natural rubber.

3. A composition comprising 50 to 95 parts by weight of crystalline, isotactic polyethylene plastic, correspondingly 50 to 5 parts of cyclized natural rubber, and 5 to 100 parts of a powdered filler per 100 parts of said polyethylene and cyclized rubber.

4. A composition comprising 50 to 95 parts by weight of polyethylene having a melting point of 130° C., correspondingly 50 to 5 parts of cyclized natural rubber, and 2 to 10 parts of natural rubber per 100 parts of said polythylene and cyclized rubber.

5. A composition comprising 50 to 95 parts by weight of an isotactic plastic monoolefin polymer having a melting point of 130°–160° C., correspondingly 50 to 5 parts of cyclized natural rubber, and 2 to 10 parts of natural rubber per 100 parts of said polyethylene and cyclized rubber, the said monoolefin being selected from the group consisting of ethylene and propylene.

6. A composition comprising 50 to 95 parts by weight of isotactic polyethylene, correspondingly 50 to 5 parts of cyclized natural rubber, 2 to 10 parts of natural rubber per 100 parts of said polyethylene and cyclized rubber, and 5 to 100 parts of a powdered filler, per 100 parts of said polymers.

7. A composition comprising 50 to 95 parts by weight of a crystalline, isotactic, predominantly straight chain plastic monoolefin polymer having a melting point of 130°–160° C. selected from the group consisting of polyethylene and polypropylene and correspondingly from 50 to 5 parts of cyclized natural rubber, the said monoolefin being selected from the group consisting of ethylene and propylene.

References Cited in the file of this patent

UNITED STATES PATENTS

| | | |
|---|---|---|
| 2,369,471 | Latham | Feb. 13, 1945 |
| 2,631,954 | Bright | Mar. 17, 1953 |

FOREIGN PATENTS

| | | |
|---|---|---|
| 544,359 | Great Britain | Apr. 9, 1942 |
| 534,888 | Belgium | Jan. 14, 1955 |